US008356396B2

(12) United States Patent
Johnson et al.

(10) Patent No.: US 8,356,396 B2
(45) Date of Patent: Jan. 22, 2013

(54) METHOD FOR MAKING THREADED TUBE

(75) Inventors: Douglas M. Johnson, Dorr, MI (US); Robert L Middleton, Sr., Middleville, MI (US); Robert L Middleton, Jr., Middleville, MI (US)

(73) Assignee: Middleville Tool & Die Company, Middleville, MI (US)

( * ) Notice: Subject to any disclaimer, the term of this patent is extended or adjusted under 35 U.S.C. 154(b) by 514 days.

(21) Appl. No.: 12/553,323

(22) Filed: Sep. 3, 2009

(65) Prior Publication Data

US 2011/0049448 A1 Mar. 3, 2011

(51) Int. Cl.
*B21D 39/03* (2006.01)
*B23P 11/00* (2006.01)

(52) U.S. Cl. .......... 29/281.1; 29/281.3; 269/55; 470/57; 72/405.01

(58) Field of Classification Search ................ 72/51, 52, 72/379.2, 368, 370.16, 404, 405.01; 76/4, 76/117; 228/151; 428/586, 592; 29/33 Q, 29/33 T, 33 D, 281.1, 281.3, 281.5, 283.5; 269/55, 60, 291, 309, 310; 470/57, 58, 66
See application file for complete search history.

(56) References Cited

U.S. PATENT DOCUMENTS 1,271,070 A * 7/1918 Palecheck et al. .............. 72/287
1,879,077 A * 9/1932 Carlsen ........................... 72/368
1,959,489 A 2/1934 Miller
1,994,428 A * 3/1935 Keil ................................ 292/58
2,081,038 A * 5/1937 Keller ........................... 29/33 Q
2,092,255 A * 9/1937 Keller ............................. 72/331
2,126,473 A * 8/1938 Keller ............................. 29/414
3,446,049 A * 5/1969 Greis .............................. 72/186
3,687,181 A * 8/1972 Coyle ........................... 411/167
4,148,426 A 4/1979 Midzutani et al.
4,266,310 A * 5/1981 Perrault et al. .................. 470/25
4,460,118 A * 7/1984 Ataka et al. ................... 228/146
4,759,487 A * 7/1988 Karlinski ..................... 228/17.5
4,860,570 A 8/1989 Perrault et al.
4,901,426 A 2/1990 Laue
4,991,419 A 2/1991 Kuroda
5,184,674 A * 2/1993 Keyes ........................... 165/184
5,301,869 A * 4/1994 Toyooka et al. .............. 228/147
5,321,968 A 6/1994 Poole et al.
(Continued)

OTHER PUBLICATIONS

"Web." Merriam-Webster Online Dictionary. Mar. 5, 2012. <http://www.merriam-webster.com/dictionary/web>.*

*Primary Examiner* — Lee D Wilson
*Assistant Examiner* — Joel Crandall
(74) *Attorney, Agent, or Firm* — Kane & Co., PLC

(57) ABSTRACT

The invention includes a method, and a component made according to the method having at least one thread pattern formed thereon from a stamping method. The invention includes a tubular member comprising a body having a wall formed from a wrapped sheet of stock to define an interior wall and an exterior wall, a seam in the wall defining a first and second end of the wrapped sheet of stock, and a thread pattern stamped on the exterior wall. The method comprises the steps of forming a blank from sheet of stock having a first surface. A thread pattern is formed onto the first surface while in a substantially sheet-like form. A bending operation then forms the sheet stock into a tubular member such that the thread pattern, located on the tube's external surface, is substantially aligned about its circumference.

22 Claims, 5 Drawing Sheets

U.S. PATENT DOCUMENTS 5,419,043 A 5/1995 Laue
5,425,286 A 6/1995 Laue
6,408,670 B1 6/2002 Trapp
6,418,611 B1 7/2002 Weber
6,591,648 B1 7/2003 Ash
6,705,143 B2 * 3/2004 Liu .................................. 72/52
6,892,559 B2 5/2005 Leiponen
6,904,677 B2 6/2005 Yamauchi
6,920,773 B2 7/2005 Leiponen
7,055,353 B2 6/2006 Cowie
7,213,436 B2 5/2007 Sturrus
7,350,386 B2 * 4/2008 Streubel ............................ 72/51
7,950,153 B2 5/2011 Dohmann
8,091,201 B2 * 1/2012 Johnson et al. ................. 29/428

* cited by examiner

METHOD FOR MAKING THREADED TUBE

BACKGROUND OF THE INVENTION

1. Field of the Invention

This invention relates to threaded tubular-structures and components, and particularly to a method and apparatus for making threaded tubular-structures and components from flat stock material.

2. Brief Description of the Related Art

Nuts, bolts, screws, and studs hold machine parts together or in place. Traditionally nuts, bolts, screws, and studs are formed from solid metal. All of these devices depend on threads. A thread in the form of a spiral ridge, uniform in size and shape, is placed regularly on the outside or inside of a cylinder.

Threads traditionally have been formed by machine or by hand. Special machines are used for quantity production of threaded machine parts. For general requirements in a machine shop, a screw-cutting lathe is employed. Threads were also formed on the exterior of metal rod by hobbing machines and the like. Threads can be formed on the outside of a metal rod also by hand using dies. Threads may also be formed on the inside of a hole using special machines or hand tools. Special tools called taps may be used on a machine or hand tool to cut threads in the interior wall of a hole.

The disadvantage of using solid metal stock for making threaded product, both male and female, is that amount of raw material needed to make the item. Solid stock is very costly. Moreover, special tools are required in high production environments to cut the threads around the solid metal stock. The instant invention provides a method and apparatus for substantially reducing the cost of raw materials in making exterior and interior threaded components. The instant invention also produces a new threaded fastener.

SUMMARY OF THE INVENTION

In accordance with one form of the invention, a method and assembly is provided for transforming a substantially flat sheet of stock into an externally threaded tubular member. The substantially flat sheet of stock is cut to dimension, has a thread pattern embossed on at least one side, and then subjected to a plurality of stamping operations where the flat stock is formed from a substantially flat form into a tubular shape without galling the threads formed thereon during an earlier step. The method includes the step of shearing the boundaries of the stock to the desired dimension; embossing a thread pattern onto a least one side of the stock; curling opposing edges of the stock in similar directions; punching the stock into a substantially tight u-shaped form; and closing the substantially u-shaped form into a cylinder. For external threads, a helical groove in the tools at each location insures the stock will be registered so that the threads migrate properly across the seam when closed.

According to another form of the invention, the boundaries of the stock are sheared to the desired dimension. A thread pattern is embossed onto a least one side of the stock. Opposing edges of the stock are curled in similar directions and the stock is formed into a first u-shaped form. The u-shaped form is further formed to produce a substantially u-shaped form. The substantially u-shaped form is subsequently closed into a cylindrical tubular form. The closed cylindrical form is compacted during a subsequent step prior to assembly. For external threads, helical grooves in the tools at each location insure that the stock is received in registered alignment and will guide the closing of the stock during the closing stage so that the threads migrate across the seam.

According to yet another form of the invention a method is provided for manufacturing a threaded tubular-member. The steps including providing stock having opposing first and second surfaces. Embossing or coining a thread pattern onto at least one of the first and second surfaces of the stock and then stamp forming the stock from a flat sheet into a tube such that the thread pattern on one of the first and second surfaces provides a substantially continuous and aligned thread pattern about a circumference of the tubular member.

According to another form of the invention, the invention includes the step of forming a plurality of blanks attached to a web from the stock, each of the plurality of blanks having a thread pattern formed thereon on a surface by a stamping process. The web of blanks formed from the stock is fed through multiple stations in a progressive die assembly to produce the stamped tubular member having the thread pattern formed thereon.

In yet another form of the invention the step of stamping the stock from a flat sheet into a tube includes an early step of curling opposite edges of the stock. Following the curling stage, the method contemplates a draw forming of the stock to bring the curled edges of the stock closer together. The work piece is stamped into a generally oval shaped work piece with the curled edges coming together. The final form is achieved by restriking the work piece in a final die, compressing the dimensions, and ensuring that the external threads are substantially continuous around the tubular form.

Although it is anticipated that the work piece may be formed at a plurality of separate single function locations or stations, it is preferred that the threaded tubular member be formed using a progressive die. The advantages provided by the instant invention is that threaded tubular members use less material and are thus less costly to produce. Moreover, the instant method allows that any diameter stamped threaded tubular member can be formed without the need for large volume runs of parts since the progressive die can be changed relatively quickly. Moreover the method of this invention also permits a greater degree of flexibility is making tubular items rather than with solid stock of limited dimension.

According to yet another form of the invention the tubular member formed according to the method includes a body having a discontinuous wall formed from a wrapped sheet of stock to define an interior wall and an exterior wall. A seam in the discontinuous wall defines a first and second end of the wrapped sheet of stock. A thread of predetermined pitch is formed on one of an interior and exterior wall prior to be formed into the tubular body. The thread pattern formed on one of the interior and exterior walls of the stock may have interruptions at strategic locations to avoid galling at parting lines for the piece.

Advantages of the invention include a cost savings in terms of materials than prior methods of using solid stock. Other advantages include more flexibility is creating forms and dimensions of structures that previously available from solid stock. The tubular stock, as compared to solid stock, is also much lighter in terms of weight without sacrificing strength.

A better understanding of the invention and the alternative embodiments may be better understood from a reading of the following detailed description taken in reference with the attached drawing figures wherein:

BRIEF DESCRIPTION OF THE DRAWING FIGURES

DESCRIPTION OF THE DIFFERENT EMBODIMENTS

For purposes of the following description, the terms "upper," "lower," "right," "left," "rear," "front," "vertical," "horizontal," and derivatives and synonyms thereof shall relate to the invention as displayed in the respective figure referenced in that portion of the detailed description. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Specific dimensions and other physical characteristics relating to the embodiments disclosed herein are not to be considered as limiting, unless the specification and claims expressly state otherwise.

The invention described herein covers a new method and apparatus for manufacturing components or parts having exterior or interior threads for receiving a matching threaded portion. As mentioned in the description of the related art, most threaded connections are completed using a solid threaded rod in the form of a bolt or screw. In the case of machine-threaded connections, such bolts or rods are often received in and held by a threaded hole or sleeve. Such connections are commonly fixed in position by the aid of a locking nut.

The problem with making threaded connections using solid threaded stock is the cost of raw materials. With the continuing increase of steel and other raw materials, solid metal rods and sleeves are much more expensive to purchase with so much waste material resulting from the cutting of the threads and drilling of holes to be tapped.

The following description is in its simplest form. Those having at least some minimal understanding of the stamping and the tool and die industry should readily understand the implementation of the invention in other tools and processes, including progressive and transfer dies. For the purposes of easy understanding, we will not describe in any detail the intricacies of the general stamping punch and die.

Figure 1:
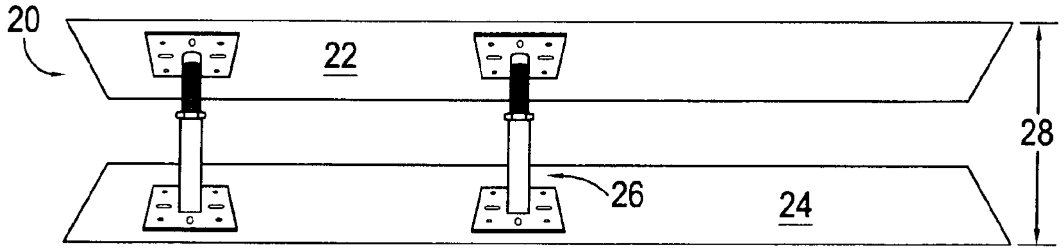
FIG. 1 is a perspective view of just one application of a product embodying the instant invention.

Referring now to FIG. 1 there is shown one application of the invention. Although the following invention may be described with reference to one or more embodiments or applications, it may become readily apparent to others having skill in the art that the invention may have other applications or used in alternative ways. The invention described herein may be equally as applicable to all situations having threaded connections.

FIG. 1 generally illustrates just one application of the instant invention. There is shown a suspended floor assembly 20 commonly used in commercial applications and in particular computer rooms and the like where a plurality of floor panels 22 are supported above a floor 24 by a plurality of floor jacks 26. The floor jacks 26 may be spaced equidistantly from one another and adjustable in a vertical direction so that the plurality of floor panels 22 is level with respect to a gravitational vertical depicted by arrow 28.

Figure 2:
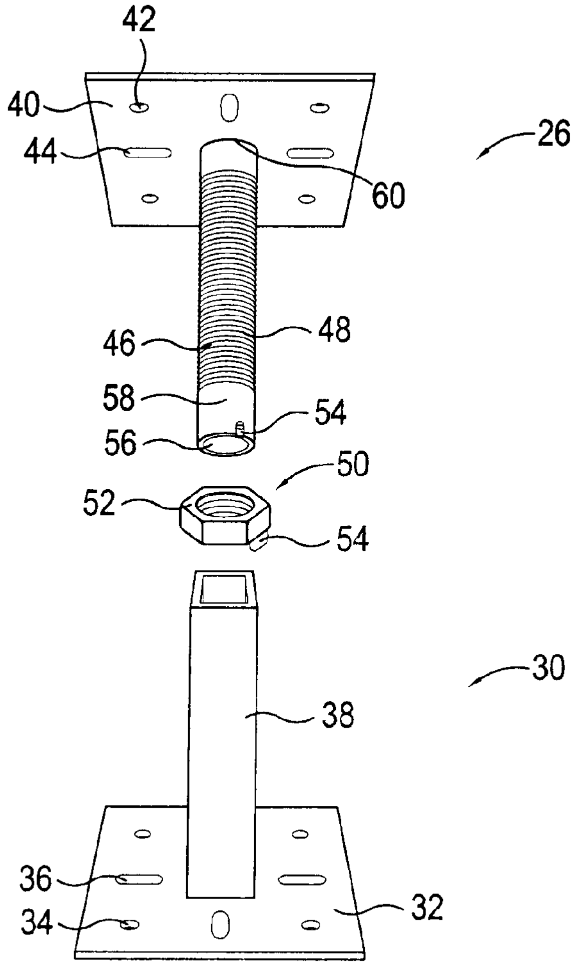
FIG. 2 is an exploded view of one assembly shown in FIG. 1.

Each floor jack 26 may include a base assembly 30 and a jacking assembly 32. The base assembly 30 includes a base plate 32 of any desired dimension and shape desired by the maker. In the embodiment shown in FIG. 2, the base plate 32 is shown to be generally square or rectangular and having a plurality of holes 34 and/or indentations 36 to permit the use of mechanical fasteners such as screws or bolts, or allow the penetration of an adhesive bonding the base plate 32 to the floor or substrate 24. Extending vertically from the base plate 32 may be a sleeve or tubular post 38, which in the embodiment shown may be square in transverse cross section. The height of the sleeve or tubular post 38 may vary depending upon the finished height of the suspended floor assembly 20 above the substrate 24. The jacking assembly 32 may include a mounting plate 40 of any desired dimension and geometric shape suitable for supporting the intersection of, and connecting, a plurality of juxtaposed floor panels such as 22. The mounting plate 40 may also include a plurality of equidistantly spaced holes 42 and/or indentations 44 to provide the desired connection with the intersecting floor panels 22. Depending from a central location of the mounting plate 40 in most cases is a jacking screw 46 having external threads 48 extending along a predetermined length of the jacking screw 46. Received along the threads 48 and rotatable thereon up and down along the length of the threads is a nut 50. The nut 50 may have substantially any external geometric shape albeit hexagonal the most common. Depending from one of an upper or lower nut surface 52 may be at least one, and preferably, two diametrically opposing tabs 54 designed to come into contact with and engage an upper edge of the tubular sleeve or post and prevented to spin with respect to the threads 48. The jacking assembly 32 is prevented from rotating relative to the base assembly 30 by at least one, and preferably, two detents or small flanges 56 formed along the jacking screw intended to engage the inner wall of the sleeve or tubular post 38.

In the prior embodiments and forms of the jacking assembly 32, the jacking screw 46 was formed from a solid rod of steel having external threads such as 48 formed thereon using anyone of a number of conventional cutting techniques including milling, lathes, and the use of cutters such as dies. In the embodiment shown in FIGS. 1 and 2 the jacking screw 46 is not formed from solid metal rod, but rather is tubular in shape. The jacking screw includes an inner wall 56 and an outer wall 58, both created by stamping a flat sheet of metal stock into a tube such that the edges of the flat metal sheet stock abut one another to form a seam 60. One end of the jacking screw 46 is swaged into a hole 62 formed in the upper mounting plate 40. Threads such as 48 are formed around the outer wall 58 of the tubular jacking screw 46 prior to forming the metal into a tubular shape as will be described in greater detail below. By replacing the traditional solid metal rod jacking screw with a tubular shaped jacking screw, a considerable amount of weight is reduced from the prior art which translate directly into substantial savings based upon the cost of the material calculated upon weight. As briefly mentioned above, the jacking screw 46 is formed into a tubular form from a flat sheet of metal stock.

Figure 3:
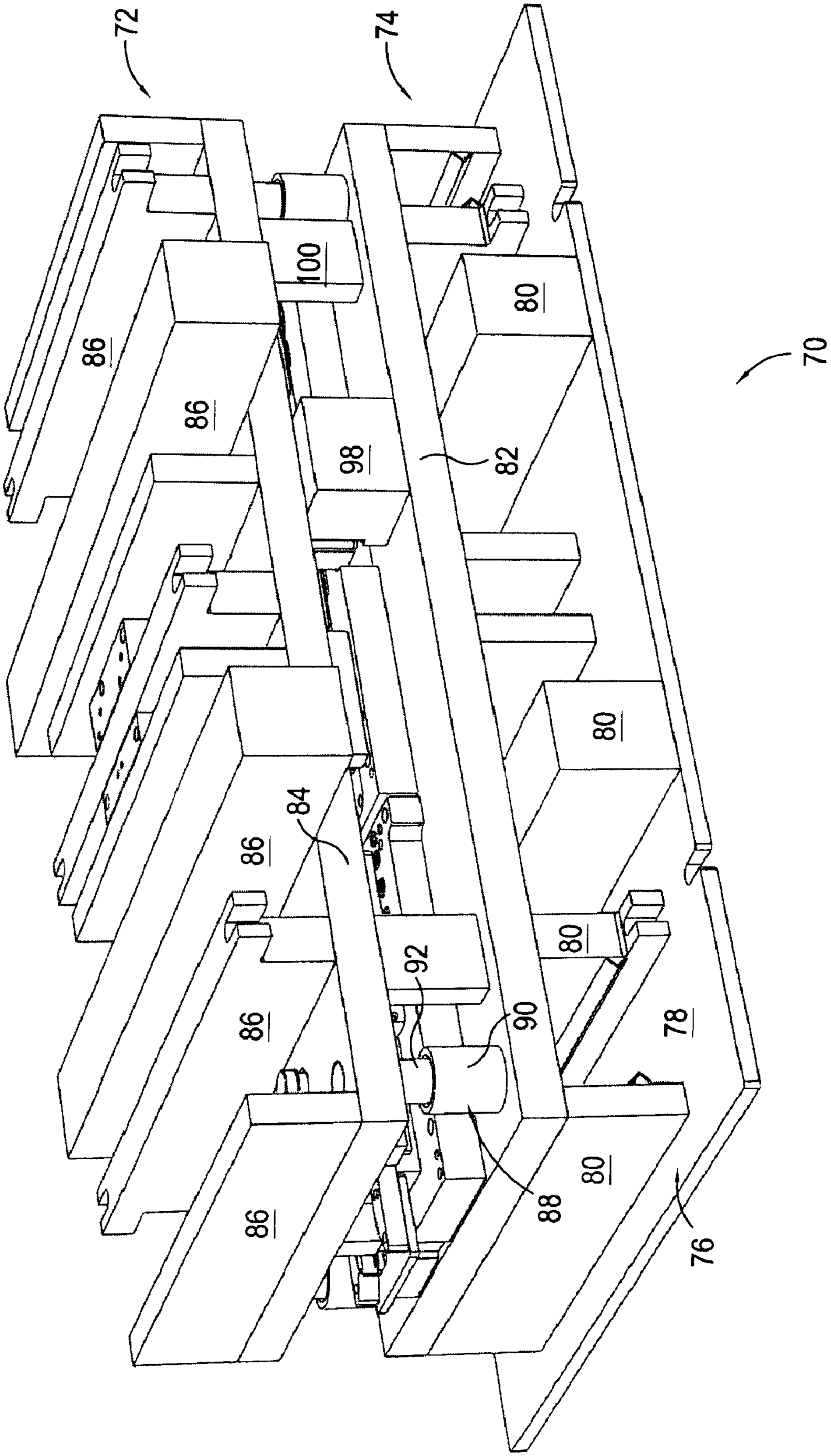
FIG. 3 is a schematic view of one embodiment of a progressive die assembly that may be used for making the invention shown in FIGS. 1-3.

FIG. 3 is a schematic diagram of one such device for making tubular items from substantially flat metal stock such as metal. The device shown in FIG. 3 is referred to in the industry as a progressive die 70. A progressive die is traditionally used in a stamping machine that operates in a reciprocating action to move tools mounted in an upper assembly such as 72 down against tools contained in a lower assembly such as 74 to act upon a work piece disposed between the two assemblies 72, 74. The upper assembly 72, also often called a punch assembly, is attached to a platen of a press. The lower assembly 74 is mounted to a lower bed or platen of the press, and remains stationary. The parts of the press will not be described in any detail and form no part of this invention.

Figure 4:
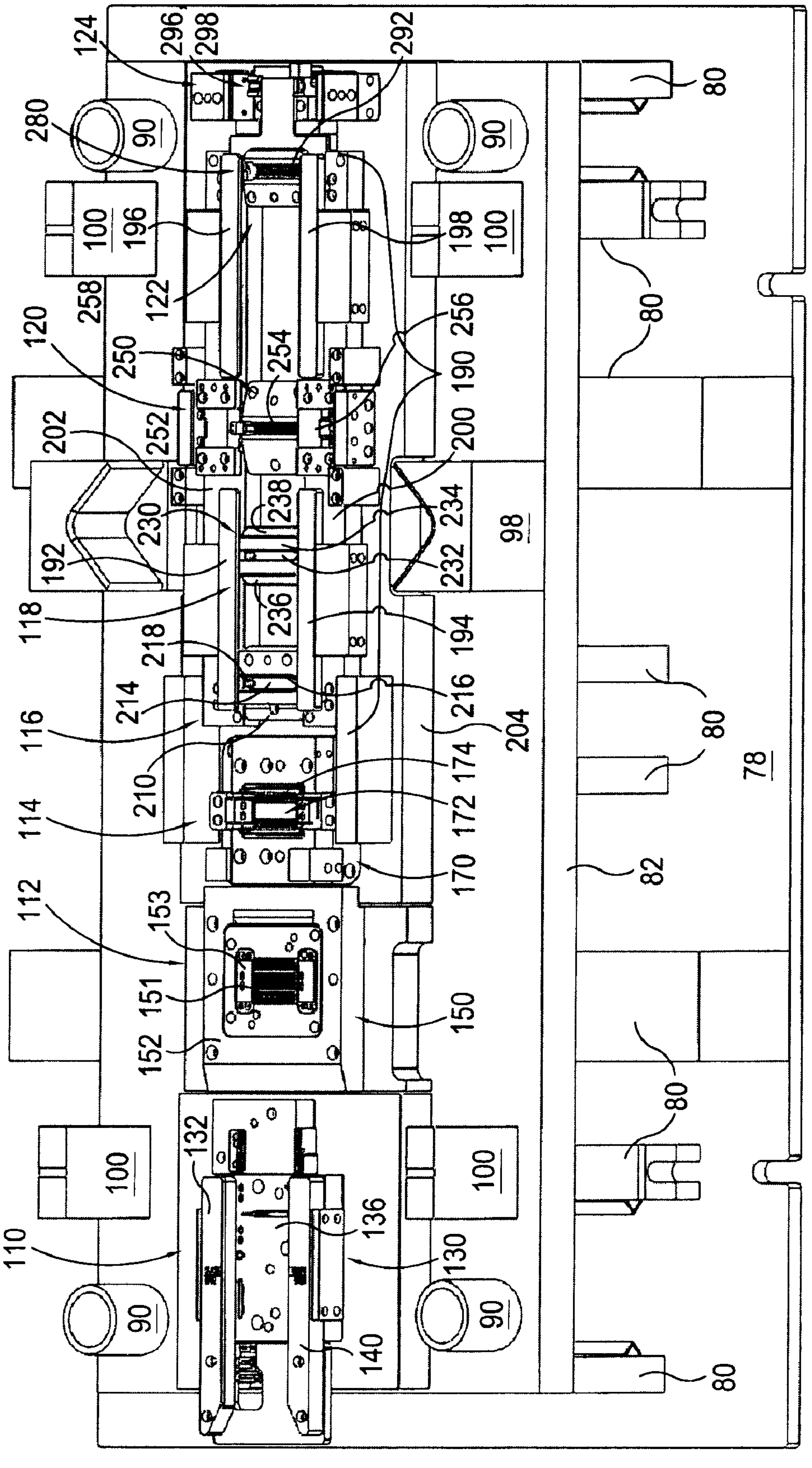
FIG. 4 is an perspective view of a lower half of the progressive die shown in FIG. 4.

Progressive die 70 includes an upper and a lower assembly 72, 74, respectively, spaced from one another. The lower assembly 72 includes a sub-plate assembly 76 comprised of a sub-plate 78, a plurality of parallels generally referred to by numeral 80 and disposed perpendicular to sub-plate 78, and a lower die shoe 82 resting on the parallels 80 and spaced above the sub-plate 78. The sub-plate 78 receives the parallels 80 that are positioned at strategic locations beneath the lower die shoe 82 at positions where the greatest amount of force will occur. The sub-plate assembly is very rigid and attached and fixed on the lower platen of the press. The upper assembly 72 is somewhat similar to the lower in that it includes an upper die shoe 84 and a plurality of parallels generally designed by reference numeral 86 extending from an upper surface 88 positioned opposite side 90 where significant pressure is intended to be applied. Unlike the lower assembly 74, the upper assembly 72 does not include a sub-plate as the parallels come into direct contact with the upper platen of the press used to operate the progressive die tool 70. The upper platen of the press reciprocates and moves the upper assembly 72 relative to the lower assembly 74. Guides generally designated by reference numeral 88 are positioned at the corners of the two assemblies and include a guide bushing 90 extending from the lower die shoe 82, each of which receive a guide pin 92 extending from the upper die's shoe 84. Typically, a cylindrical ball bearing sleeve 94 is disposed between the guide pins and the guide bushings to reduce friction and keep the two components aligned. Additional components are also used to keep the two assemblies 72, 74 aligned. These include wear plates 96 and wear blocks 98 mounted opposite one another on the faces of the lower and upper dies shoes 82, 84 better shown in FIGS. 4 and 5. The wear plates and blocks 96, 98 help to keep one dies shoe from rotating relative to the other during operation. Often the wear plates and blocks 96, 98 are mounted laterally along the die shoes 82, 84, inboard from the ends of the tool, and on opposite sides. Other structures well known in the art and common in all dies are the stop blocks 100. In the embodiment shown in the figures, the stop block 100 are mounted to the lower die shoe 82 proximate and inboard of the guide bushings 90. The stop blocks 100 are designed to limit the lower travel of the upper die shoe 84 during the downward stroke of the press, and reducing damage to the respective tools or stations mounted on the cooperating assemblies.

The upper and lower die shoes 82, 84 contain a number of stations or tools that interact with one another to form a work piece in a series of steps. The work piece is usually attached to a web that works its way along each station or tool to place the work piece at the desired location when the upper and lower assemblies close. As the assemblies open, the web moves the work piece to the next station. The following description will address the different tools or stations disposed along the upper and lower assemblies.

Figure 5:
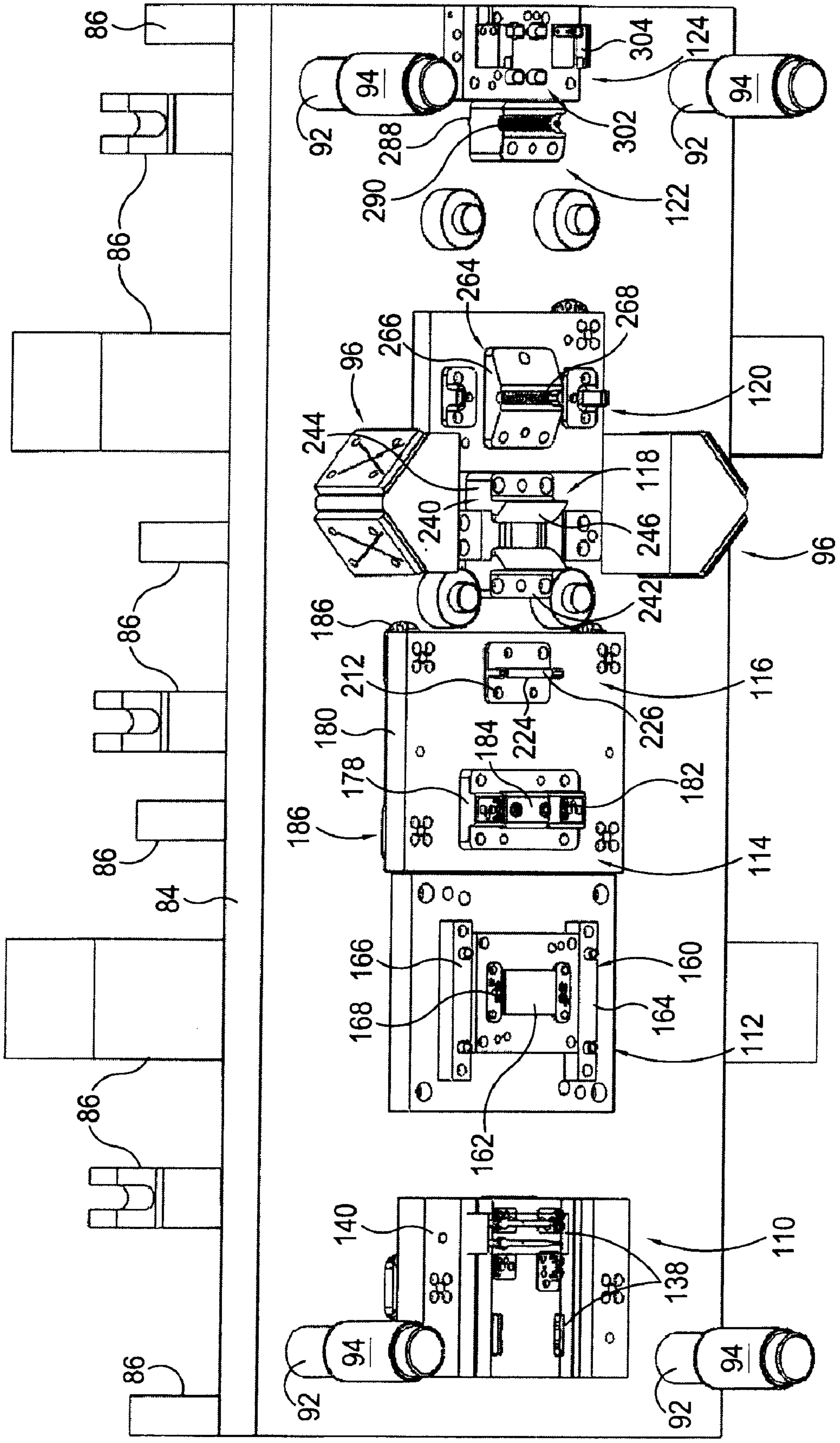
FIG. 5 is a perspective view of an upper half of the progressive dies shown in FIG. 4.

Referring to FIGS. 4 through 7, the lower and upper dies shoes 82, 84 respectively, contain a plurality of tools that interact with one another upon a work piece when the two come together, operated by the press. Thus, each contains a mating portion of a tool or station. Also shown in the figures schematically is a metal web 102 that is passed in a series of progressive positions to form the work piece. The web is usually a solid sheet of metal moved a desired distance by a stock feeder (not shown) disposed at the end of the progressive die closest to the first operating station or tool. For reference purposes, the stock feeder is to the right of FIGS. 4, 6 and 7. FIG. 5 should be inverted and positioned above the assembly shown in FIG. 4.

In a preferred embodiment of the invention, the progressive die 70 includes a plurality of stations generally identified by reference numerals 110, 112, 114, 116, 118, 120, 122, and 124. Each station is generally supported on the backside of each dies shoe by a respective parallel briefly mentioned above. The largest parallels are located opposite stations 112 and 120 where it is anticipated the greatest forces will be applied. In general, the first station 110 performs a punch function on the web 102 where material is removed from the web 102 to create physical boundaries between the different work pieces to be formed along the web 102. Station 112 imparts a special thread pattern on one surface of the different work pieces while station 114 imparts an initial forming step. Stations 116 and 118 provide gross forming steps following the initial forming step at station 114. Station 120 performs the final forming step in the method while station 122 restrikes the work piece to more clearly define the structures and tightly compact the overall work piece. The last station 124 removes the final form from the web and ejects the work piece from the progressive die 70.

Station 110 includes a lower tool 130 mounted to the lower die shoe 82 that includes two spaced apart guide rails 132, 134 intended to receive and position the web 102 there between. Guide rails 132, 134 are mounted to the upper surface of a die 136. Die 136 includes a plurality of holes and passages arranged in the shape of the material to be removed from the web. The holes in die 136 are designed to receive corresponding punch steels 138 disposed in the upper tool 140 of station 110. The punch steels 138 pierce and shear the web 102 to create the work piece boundaries with the exception of a small portion that keeps the work piece attached to the web 102 allowing it to be moved along with the web to the different stations. Two steps are contemplated to take place at station 110: one parallel to the edges of the metal stock and a second perpendicular thereto to separate each work piece from an adjacent one as will become more readily apparent below. The upper tool 140 also includes a pressure plate assembly 142

Exiting station 110, the web passes through a gap where no work is performed before station 112. Station 112 performs the function of imparting a thread pattern to one surface of the work piece once the boundaries have been defined by the previous station 110. The thread pattern is created by tool 150 made from hardened steel and having a field 151 of repeating ridges and troughs to provide the desired thread profile. The ridges and troughs on the tool face are inclined at a desire angle to provide the desired pitch or threads per linear inch. Outboard of thread field 151 are locating holes 153 intended to engage corresponding locating pins described in greater detail below. Thread tool 150 is rigidly attached to a bumper sub-plate 152 that is rigidly attached to the lower die shoe 82. Surrounding the thread tool 150 and connected to bumper sub-plate 152 is a pressure plate 154. The pressure plate 154 is supported above the bumper sub-plate 152 by a plurality of gas springs 156 and guide pins 158. The pressure plate 154 actually supports the web 102 above the thread tool surface as the web is progressively moved along the die 70. The cooperating portion 160 of the thread tool 150 attached to the upper die shoe 84 includes a generally flat or tabular punch block 162 including spaced apart and substantially parallel guide rails 164, 166 for centering the web 102. Tool 160 also includes locating pins 168 for engaging that portion of the web 102 removed by the punch at station 110 as well as locating holes 153 described above to ensure that the work piece is properly located above and engaged with the face of the tread tool 150.

One of ordinary skill in the art of tool and die making would make it possible to interchange the thread tool 150 so as to accommodate different tools depending upon the pitch of the thread pattern to be imparted to the work piece. In one embodiment of the invention, it is contemplated that the imparted thread pattern may be interrupted along two generally parallel portions of the pattern. The parallel interruptions in the pitch of the thread pattern are preferably located along that portion of the work piece where the subsequent tools come together, better known as the parting line. By omitting the thread pattern where the parting line occurs, one is less likely to damage the thread pattern by any subsequent tooling operation.

Adjacent station 112 is station 114 where the early forming of the tube shape begins. The work piece attached to the web 102 is moved into position above station 114 by the stock feeder briefly mentioned above. Station 114 includes a lower die 170 including a shallow depression 172 having upwardly-radiused opposing edges 174 and dimensioned to receive the work piece therein. Outboard the ends of the depression 172 are locating holes 176. The upper die 178 of station 114 includes a punch 180 having a positive contour corresponding in shape to that of the depression 172, and corresponding locator pins 182 to be received by the web and ultimately in the locating holes 176 as the die 170 is closed. Punch 180 is mounted to a separate punch block 184 that in turn is fixed to the upper die shoe 84 via a plurality of gas shocks 186 to permit some give and shock absorption as the tools come together. At this station, as upper die 178 closes against lower die 170, the opposing edges of the work piece are rolled slightly as will become apparent below.

Stations 116, 118, 120, and 124 are where intermediate and final forming steps of the tube shape occur. Mounted above and extending along each of the stations 116, 118, 120, and 124 is a guide assembly 190 including a plurality of parallel and spaced apart guide rails 192, 194, 196, and 198 mounted to pressure beams 200, 202. The pressure beams are attached to a foot 204 via a plurality of gas shocks 206 to permit the guide rails to move up and down relative to the foot 204. Foot 204 is rigidly attached to the lower die shoe 82. Prior to this point, the work piece has been substantially planar in form, retaining much of its shape as it did in the web. The guide assembly 190 receives the web 102 and keeps it with a position vertically relative to the respective stations to ensure accuracy during forming.

Station 116 is responsible for creating the first substantial bend in the work piece to form the desired tubular shape. Station 116 includes a lower U-die 210 and an upper U-punch 212. The U-die 210 includes a substantially U-shaped longitudinal recess or die cavity 214 corresponding in length to the length of the finished tubular shape. The areas of cavity 214 proximate each end may be changed depending upon the desired shape. In a preferred embodiment of this particular form of the invention, the U-shaped cavity 214 includes a reduced diameter throat 216 at end 218 and increased diameter throat 220 at an opposite end 222. The ends of the U-shaped cavity 214 are open so as to keep the work piece in contact with the web 102 during the forming process. The steel for the U-die 210 may be a separate tool and is attached either directly to the lower die shoe 82 or to the foot 204 supporting the guide assembly 190. The upper U-die 222 shown in FIG. 6 may be a simple beam or tablet member 224 extending perpendicularly from the upper punch 180 with a radiused lower end 226. The length of the U-die 222 is coincident with the stroke so as to force the work piece entirely down into the U-die cavity 214.

Figure 6:
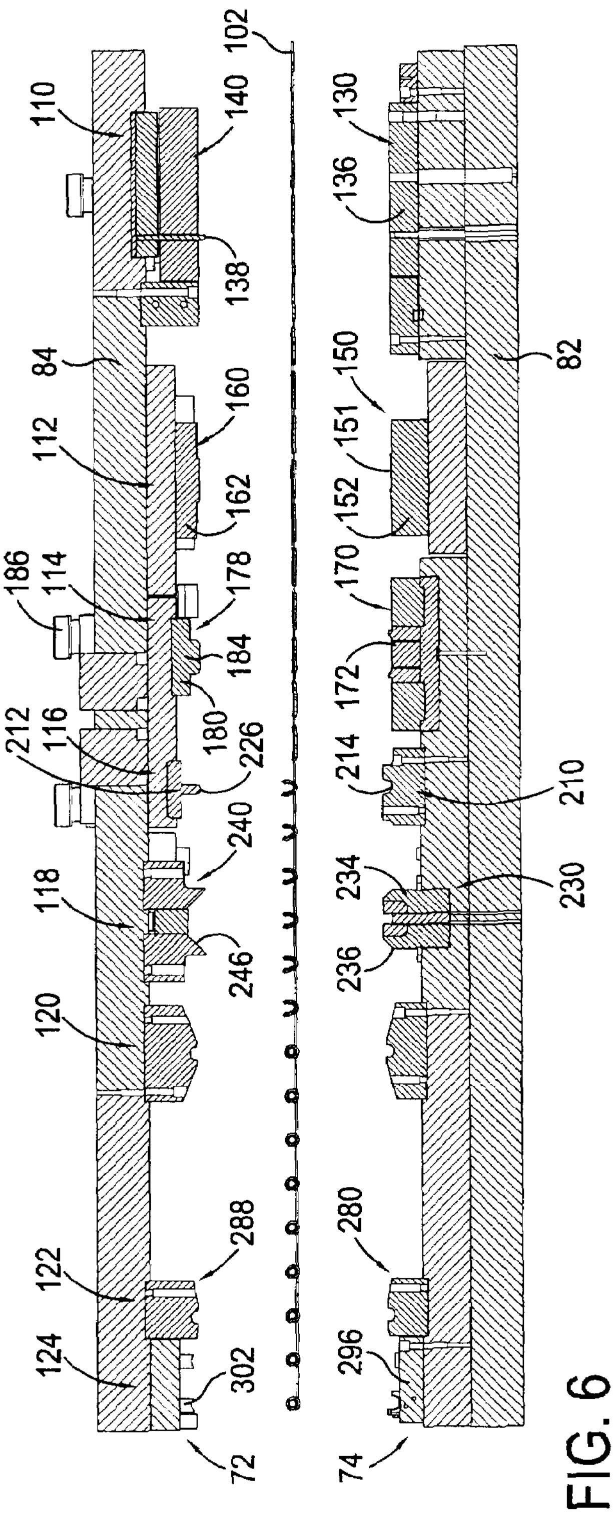
FIG. 6 is a longitudinal cross-sectional view of the invention shown in FIG. 3 in an open position.

Station 118 is responsible for beginning the closure of the work piece after being first formed into a generally U-shape by station 116. At station, 118 the work piece is received above a lower cam tool 230 that includes a seat 232 bordered on either side by cams 234, 236 that are pivotally mounted at their base so that the upper portions of the cam can pivot in towards on another and toward seat 232. The cams have tapered outer surfaces 238 that contact the upper cam tool 240 to force the cams 234, 236 inwardly. The upper cam tool 240 seen in FIG. 6 is simply a pair of fixed blocks 242, 244 fixed to the upper die shoe 84 and having inwardly tapered surfaces 246 positioned to engage the tapered outer surfaces 238 of the cams 234, 236 when the progressive die 70 is closed.

The work piece attached to the web 102 now is in a substantially elongate oval shape. Station 120 closes the work piece in a tubular shape, aligns the external threads across the seam, and keeps dimensional tolerance of the work piece. Station 120 includes a lower closing tool 250 having a U-shaped cavity 252, the walls of which include helical grooves 254 that match the external thread pattern embossed on the lower surface of the work piece at station 112. The dimension of the U-shaped cavity 252 along with the helical grooves 254 provide a nearly perfect seat for receiving the work piece as it is received by the tool. The lower closing tool 250 is rigidly mounted to the same foot 204 extending between stations 114 and 122, and beneath the guide assembly 190 so that the work piece attached to the web is properly positioned above the station.

Positioned in line with the guide assembly 190 at station 120 are end-cam assemblies 256, 258, each located intermediate guide rails 192, 196, and 194, 198, respectively. End-cam assemblies 256, 258 move with the guide assembly 190 since they are attached to a respective pressure plate 200, 202. Each end-cam assembly 256, 258 include a horizontally inward-translating cam 260 constrained between two cam guide blocks generally identified by reference numeral 262.

The upper closing tool 264 is identical to that of lower closing tool 250. Tool 250 includes an identically dimensioned U-shaped cavity 266 and helically grooved cavity wall 268 to receive the work piece therein and match the thread pattern imparted to the exterior of the work piece. The upper closing tool 250 mounts to the upper die shoe 84 so that the force of the press transfers directly to the forming process. Surrounding the upper closing tool 250 is a pressure plate 270 spaced from the upper die shoe 84 by a plurality of gas springs 272. Cam actuators 276, 278 are mounted to the lower surface 274 of pressure plate 270 and positioned outboard opposite lateral ends of the upper closing tool 266 to engage a cam 260. The actuators cause the cams to translate within the cam guide blocks 262 when tools 250 and 264 are closed together. The upper pressure plate 270 engages the spring biased guide assembly 190 mentioned above to properly position the work piece between the tools. The cam actuators 276, 278 respectively engage a cam 260 forcing each inwardly to contact the opposite ends of the work piece as the lower and upper closing tools 250, 264 close about the work piece, aligning the external threads with the helical grooves in each half of the assembly. Upon total closure of the closing tools 250, 264 the work piece is entirely closed into a tubular shape. The helical grooves 254, 268 in the U-shaped cavities 252, 266 register with the external thread pattern and force them into alignment across the closed seam in the work piece. The inwardly translating cams that engage the ends of the work piece as the tool is closed prevent longitudinal expansion of the tubular work piece.

Station 122 represents the re-strike station in the process of the invention before the removal of the work piece from the web 102 and ejection to a collection bin (not shown). Up to this point, the stock has been transformed from a substantially flat cut sheet to an externally threaded tube. One end of the tubular form has a diameter less than that of the tube and the opposite end is slightly larger in diameter. It may be desired to change the shapes of one or both ends from a cylindrical form to a rectangular form depending upon the desired application. However, in a first form of this invention, station 122 includes a lower re-strike tool 280 having a hemi-cylindrical cavity 282 of a dimension representing the final dimension of the work piece. As shown in the figures, hemi-cylindrical cavity 282 is generally U-shaped wherein the wall 284 includes a helical groove pattern 286 identical in many respects to that present in the previous station. The lower re-strike tool 280 is attached to the foot 204 intermediate the guide rails 196, 198 of the guide assembly 190. The upper portion 288 of the re-strike tool is similarly mounted directly to the upper die shoe 84 direction opposite that of the lower re-strike tool 280, and includes a matching hemi-cylindrical depression 290, both of a dimension equally the final form of the work piece. The work piece is properly located and registered in the lower re-strike tool with the aid of the shape of the work piece, the external threads received in the helical grooves, and the guide assembly. The two portions of the re-strike tool 280, 288, when fully closed, re-strike all of the circumferential surfaces of the work piece wherein the one cavity formed by the two halves is actually dimensionally smaller than the previous tools. With the work piece in the smaller cavity, the external threads are forced into the helical grooves to be more sharply defined. Moreover, the compression of the overall cylindrical tubular body forces the seam together and clearly defines the continuation of the threads across the seam to reduce the chance for interference.

Station 124 represents the final station in the process where the work piece is removed from the web 102 and ejected into a container. Station 124 includes a lower tray 296 having a hemi-cylindrical recess 298 formed therein to receive the work piece. Outboard of the tray 296 at opposite lateral ends are two openings 300 that pass entirely through the foot 204 and extend through the lower die shoe 82. Laterally outboard of the openings 300 are wear blocks 302. Positioned above the tray 296 and mounted to the upper die shoe 84 is a retainer 302 that covers the work piece when the press closes to hold the work piece in position. Laterally outboard of the retainer 302 at opposite ends are shear blocks 304. When the press closes the retainer presses the work piece down into the recess 298 formed in the tray 296 to position the work piece therein. When in position, shear blocks 304 shear the work piece from the web 102, allowing the cut-off web to fall through openings 300 to a waste system below. Once the web has been removed, the press is opened and an ejector, attached to the guide assembly, lifts the work piece from the cut-off die into a trough that dumps the finished tubular member into a bin.

Figure 7:
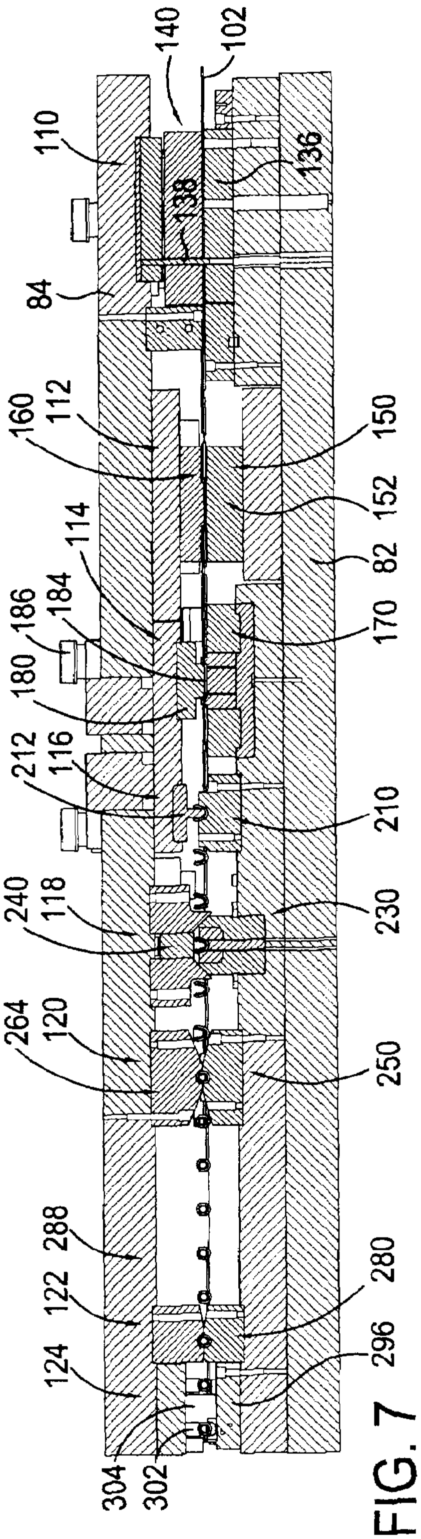
FIG. 7 is a longitudinal cross-sectional view of the invention shown in FIGS. 3 and 6 in a closed position.

The best mode of operation of the invention is best understood by referring to FIGS. 6 and 7. The figures illustrate a segment of the web 102 containing the work pieces after passing through stations 110, 112, 114, 116, 118, 120, 122, and 124. At one end of the web 102 is a completed work piece 310 in the form of a cylinder having external threads formed in the stamping process. At the opposite end is an unaltered portion of the roll material that has not been acted upon by the assembly 70. Moving from the right hand portion of the figure to the left hand portion, one can see that the first step of the method is to remove or punch two elongate rectangular strips 312, 314 through the material adjacent opposing edges 316. Following the punch of the edge slots 312, 314, a second punch in station 110 punches out material to produce a gap 318 intermediate and joining the edge slots 312, 314 and defining the boundary of the work piece 310. As the web reaches station 112, the thread pattern is embossed to one of the surfaces of the work piece 310. In the form of the invention described herein, it is preferred that the thread pattern is embossed to the lower or exterior surface of the work piece. One or more idle positions may be between station 112 and 114 before the first bending of the work piece occurs. As mentioned above, the substantially flat work piece 320 having the embossed thread pattern is acted upon at station 114 where the edges of the work piece are curled up slightly. Following station 114, the work piece is passed to station 118 where a the edges of the work piece are slightly curled upwards, produced by punch 180 bending the work piece into depression 172. At this point, the edges are curled just enough to ensure that when formation is complete, the edges of the work piece will be facing one another and tightly engaged. This step also ensures that the thread pattern on the exterior of the work piece can be migrated from one edge to the other without interruption.

Following the curling of the work piece edges at station 114, the subsequent steps are performed with greater precision than the previous steps, thus the use of the guide assembly 190. The guide assembly, aided with the substantially precision stock feeder, along with the guide pins and proximity sensors at the stations, substantially improves positioning of the work piece at each station. Stations 116, 118, and 120 substantially form the cylindrical shape of the work piece. Station 116 forms the initial u-shaped bend by forcing the work piece into the unshaped cavity 214 by U-punch 212 on the upper die shoe 84. Once formed the work piece is passed to cam tool where the edges of the work piece are brought closer together when the cams 234, 236 punch the sides of the u-shaped work piece towards one another in preparation for the next step. Once the work piece exits station 118, the work piece is substantially oval in cross section, the lower closed end of the work piece having its external threads seated in the threads of the seat 232. The sides of the work piece are vertical forming the elongate portion of the oval. The upper and still open end of the work piece as its edges substantially close to one another and not so far apart so as not be to be received in the next tool.

Station 120 substantially closes the previously oval shape into a cylinder. The external threads of the work piece are now received in registered alignment with the helical grooves 254 formed in the unshaped cavity 252 with the open ends of the work piece oriented at the top of the work piece. As the closing tool 250 closes, the somewhat open upper end is engaged by the upper closing tool where the helical grooves 268 contact the exterior formed threads. As the tool 250 closes, the oval shape is transformed into the cylindrical shape formed by the cooperating tools, forcing the sides toward the sidewalls of the cavity 252, 266 into a generally cylindrical form. Galling of the threads is prevented along the parting line of the closing tool as a break in the exterior threads occurs along that portion of the exterior when the threads were embossed on the surface. The other threads migrate, translate, or otherwise move so they fit in a respective helical portion of the grooves 254, 268 formed by the two closing tool halves 250, 266. The end cams 256, 258 reduce longitudinal expansion of the work piece when the work piece is closed by engaging the ends of the work piece when the tool is closed.

Final closing of the work piece at station 120, the work piece is restruck at station 122. Restriking station 122 is slightly different from the tools at station 120 in that the cavity formed by elements 282 and 290 are slightly smaller in dimension that that found at station 120. As the work piece is located at station 122, closure of the two tool halves 282 and 288 compress the diameter and further define the external threaded surface using the similar helical grooved surfaces; thus the external thread pattern across the seam produced by the joined edges migrate smoothly without interruption or fouling.

At this point, the work piece is substantially completed and ready to be removed from the web 102. Station 124 shears the small portion of webbing still connected to the cylindrical form when the tool is closed. An ejector associated with the pressure beam 200 ejects the work piece once separated from the web. The shear also drops that portion of the sheared web through openings 300 for recycling.

Once the work piece is formed, the jacking screw 46 is threaded onto the exterior threads 48. The work piece, now referred to as the jacking screw, has its smaller diameter end swaged into a central hole located in the mounting plate 40. The opposite, more rectangular formed large end of the work piece is dimensioned to fit within the tubular sleeve 38 that is fixed to the base so that the jacking screw 46 does not rotate therein, but only allowed to translate parallel to the longitudinal axis of the concentric tubes. Rotation of the jacking screw in contact with tubular sleeve forces the jacking screw 46 up or down, depending upon the direction of rotation. This in turn changes the relative position of the mounting plate, and thus directly the height of anything supported thereon such as a floor.

A number of different types or grades of steel, aluminum, or other metals may be used to form the floor jacks 26 or other structures having a stamped tubular thread or screw such as described above, depending in large part upon the intended use. For higher stress applications, it is anticipated that hardening of the metal may be done post formation. Softer metals may be desired if deformation or some form of energy or shock absorption is desired. In the embodiment described above a preferred metal is high carbon cold-rolled steel.

Those of ordinary skill in the art will appreciate that other components may include, but are not limited to, a die stripper, a stripper back up, and a translator for moving a metal web from tool station to tool station, among other things. Proximity sensors may also be used and would be preferred in some locations to ensure that a part occupies a location before operation of the progressive die. Those having ordinary skill in the art will appreciate where such devices are best used.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents. The embodiments of the invention in which an exclusive property or privilege is claimed are defined below.

Having now described the features, discoveries and principles of the invention, the manner in which the invention is constructed and operated, the characteristics of the invention, and the advantageous, new and useful results obtained; the new and useful structures, devices, elements, arrangements, parts and combinations are set forth in the appended claims.

The invention claimed is:

1. A method for manufacturing a threaded tubular-member comprising the steps of:

providing sheet stock having opposing first and second surfaces, opposing first and second edges, and an initial thickness;

feeding the sheet stock through a tool comprising a coining tool to produce a threaded pattern, at least one forming tool for forming a tubular shape, and at least one restriking tool;

coining a thread pattern onto said first surface of the sheet stock with said coining tool;

stamping said sheet stock from a flat sheet into said tubular shape using said at least one forming tool so that said thread pattern on said first surface provides a substantially aligned thread pattern about an external circumference of said tubular shape;

aligning said tubular shape in said restriking tool by aligning said thread pattern with a pattern of helical grooves on at least one surface of a die cavity; and compressing said tubular shape wherein the material thickness between said first and second surfaces is increased over said initial thickness of said sheet stock and said tubular shape's threaded pattern is forced against said pattern of helical grooves on said cavity causing said thread pattern to be more sharply defined.

2. The method as defined in claim 1, further comprising the step of forming a plurality of substantially flat blanks from the sheet stock, each of the plurality of blanks having a thread pattern coined therein.

3. The method as defined in claim 1, wherein the step of stamping the sheet stock from a flat sheet into a tube comprises the steps of:

curling mating edges of the sheet stock to produce a broad u-shaped member; draw-forming the broad u-shaped member into a second u-shaped member bringing the mating edges of the sheet stock closer together; and compressing the second u-shaped member into a generally oval member such that the mating edges of the sheet stock come together to form a tube.

4. The method as defined in claim 1, wherein the step of coining comprises striking a thread-pattern onto said first surface of the sheet stock, said thread pattern interrupted by a plurality of non-threaded regions; and wherein a final form of the threaded tube contains a thread pattern interrupted by a plurality of non-threaded regions.

5. The method as defined in claim 1, wherein the step of coining comprises the step of striking an uninterrupted thread-pattern onto said first surface of said sheet stock.

6. The method as defined in claim 1, wherein said pattern of helical grooves of said restrike tool have a pitch and an angle matching that of said coining tool.

7. The method as defined in claim 1, wherein the step of stamping comprises the step of engaging the sheet stock from opposing directions to form said tube.

8. The method as defined in claim 1, further comprising the step of shaping a first end of said threaded tubular member into a rectangular form.

9. The method as defined in claim 1, wherein the step of coining comprises the step of striking a thread-pattern onto said first surface of the sheet stock, said thread pattern interrupted along two generally parallel portions of the threaded pattern.

10. The method as defined in claim 1, wherein the step of coining comprises the step of striking a thread-pattern onto said first surface of the sheet stock, said thread pattern interrupted in a region adjacent a parting line.

11. A threaded tubular member manufactured according to the method comprising the steps of:

providing sheet stock having opposing first and second surfaces, opposing first and second edges and an initial thickness;

feeding the sheet stock through a multiple-station tool comprising a coining tool to produce a threaded pattern, at least one forming tool for forming a tubular shape, and at least one restriking tool;

coining a thread pattern onto said first surface of the sheet stock with said coining tool;

stamping said sheet stock into said tubular shape using said at least one forming tool so that said thread pattern on said first surface provides a substantially aligned thread pattern about an external circumference of said tubular shape;

aligning said tubular shape in said restriking tool by aligning said thread pattern with a die cavity further comprising a pattern of helical grooves on at least one surface of the cavity; and compressing said tubular shape, wherein the material thickness between said first and second surfaces is increased over said initial thickness of said sheet stock, forcing said tubular shape's threaded pattern against said pattern of helical grooves on said cavity causing said threaded pattern to be more sharply defined.

12. The threaded tubular member defined in claim 11, wherein the step of providing a metal blank includes providing a plurality of metal blanks along a sheet of metal stock.

13. The threaded tubular member defined in claim 11, wherein the step of coining further comprises striking a thread-pattern onto said first surface of the sheet stock, said thread pattern interrupted by a plurality of non-threaded regions.

14. The threaded tubular member defined in claim 11, wherein the step of coining comprises the step of striking a thread-pattern onto said first surface of the sheet stock, said thread pattern interrupted along two generally parallel portions of the threaded pattern.

15. The threaded tubular member defined in claim 11, wherein stamping said sheet stock comprises the steps of:

bending first and second opposite edges of said sheet stock to form a broad generally U-shaped form;

closing said deep U-shaped form such that said first and second opposite edges of said metal blank substantially close to form a tube; and striking said tube from opposite directions to create a substantially cylindrical tubular member.

16. The threaded tubular member defined in claim 15, further comprising restriking said tube from opposite directions in a tool to compress said tube abutting said first and second edges and further defining the continuation of thread across a seam.

17. The threaded tubular member defined in claim 15, further comprising nesting said generally U-shaped form and said deep U-shaped form in a tool having a thread pattern matching that of said coining tool.

18. The threaded tubular member defined in claim 15, wherein said thread pattern of said restriking tool matches said thread pattern of said coining tool.

19. A tubular member made according to the method of claim 11, comprising:

a body having a wall formed from a wrapped sheet of stock to define an interior wall and an exterior wall;

a seam in said wall defining a first and second end of said wrapped sheet of stock;

a thread pattern stamped on said exterior wall, said thread pattern interrupted by a plurality of non-threaded regions; and at least one end of said wrapped sheet of stock having a rectangular form.

20. The method as defined in claim 11, further comprising the step of shaping a first end of said threaded tubular member into a rectangular form.

21. The threaded tubular member defined in claim 11, wherein the step of coining comprises the step of striking a thread-pattern onto said first surface of the sheet stock, said thread pattern interrupted in a region adjacent a parting line.

22. A method for manufacturing a threaded tubular-member, comprising the steps of:

providing sheet stock having opposing first and second surfaces and opposing first and second edges;

feeding the sheet stock through a multiple-station tool comprising a coining tool to produce a threaded pattern, at least one forming tool for forming a tubular shape, and at least one restriking tool;

coining a thread pattern onto said first surface of the sheet stock with said coining tool, said pattern containing an angle and a pitch, said pattern interrupted along two generally parallel portions of the threaded pattern;

stamping said sheet stock from a flat sheet into said tubular using said at least one forming tool so that said thread pattern on said first surface provides a substantially aligned thread pattern on an external circumference of said tubular shape;

aligning said tubular form in said restrike tool by aligning said thread pattern with a die cavity further comprising a pattern of helical grooves on at least one surface of the cavity matching said pitch and said angle of said coining tool;

compressing said tubular form, wherein the material thickness between said first and second surfaces is increased over the initial thickness of said sheet stock and said tubular form's threaded pattern is forced against said pattern of helical grooves on said cavity causing said thread pattern to be more sharply defined; and shaping at least one end of said threaded tubular form into a rectangular form.

* * * * *